United States Patent
Lee et al.

(10) Patent No.: US 10,257,521 B2
(45) Date of Patent: Apr. 9, 2019

(54) METHOD AND APPARATUS FOR PROCESSING VIDEO SIGNAL

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 163 days.

(21) Appl. No.: 15/511,764

(22) PCT Filed: Sep. 30, 2015

(86) PCT No.: PCT/KR2015/010282
§ 371 (c)(1),
(2) Date: Mar. 16, 2017

(87) PCT Pub. No.: WO2016/052977
PCT Pub. Date: Apr. 7, 2016

(65) Prior Publication Data
US 2017/0295376 A1    Oct. 12, 2017

(30) Foreign Application Priority Data

Oct. 1, 2014 (KR) .................. 10-2014-0132470
Oct. 8, 2014 (KR) .................. 10-2014-0135514

(51) Int. Cl.
| H04N 19/159 | (2014.01) |
| H04N 19/50 | (2014.01) |
| H04N 19/70 | (2014.01) |
| H04N 19/182 | (2014.01) |
| H04N 19/513 | (2014.01) |

(Continued)

(52) U.S. Cl.
CPC ......... *H04N 19/159* (2014.11); *H04N 19/105* (2014.11); *H04N 19/182* (2014.11); *H04N 19/436* (2014.11); *H04N 19/50* (2014.11); *H04N 19/513* (2014.11); *H04N 19/70* (2014.11); *H04N 19/93* (2014.11); *H04N 19/94* (2014.11)

(58) Field of Classification Search
CPC ... H04N 19/159; H04N 19/105; H04N 19/436
See application file for complete search history.

(56) References Cited

U.S. PATENT DOCUMENTS

| 2007/0146173 A1 | 6/2007 | Sakaguchi | |
| 2017/0238001 A1* | 8/2017 | Li | 19/436 |

OTHER PUBLICATIONS

Jing Ye et al., "Improvements on 1D dictionary coding", JCTVC-Q0124, Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, pp. 1-16.

(Continued)

*Primary Examiner* — Nam D Pham
(74) *Attorney, Agent, or Firm* — IP Legal Services, LLC

(57) ABSTRACT

A method for processing a vide signal according to the present invention comprises: determining a length of a current string, which is decoded on the basis of a sample string matching technique in a current block; determining a reference string on the basis of at least one between the length of the current string and a string vector for the current string; and predicting the current string using the reference string.

15 Claims, 12 Drawing Sheets

(51) Int. Cl.
*H04N 19/105* (2014.01)
*H04N 19/436* (2014.01)
*H04N 19/93* (2014.01)
*H04N 19/94* (2014.01)

(56) References Cited

OTHER PUBLICATIONS

Liping Zhao et al., "SCCE4 : Results of subtest 3.3", JCTVC-R0060, Joint Collaborative Team on Video Coding (JCT-VC) of ITU-T SG 16 WP 3 and ISO/IEC JTC 1/SC 29/WG 11, 18th Meeting: Sapporo, Japan, Jun. 30-Jul. 9, 2014, pp. 1-13.

Feng Zou et al., "Pixel-based 1D Dictionary Coding", JCTVC-Q0149, Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, pp. 1-5.

Zhan Ma et al., "Description of screen content coding technology proposal by Fluawei", JCTVC-Q0034-r1, Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, pp. 1-22.

\* cited by examiner

FIG. 6

| palette_coding(x0,y0,nCbS){ | Descriptor |
|---|---|
| ... | |
| numPredPreviousPalette=0 | |
| for(idx=0;idx<previous_palette_size; idx++){ | |
| S600 — previous_palette_entry_flag[idx] | ae(v) |
| if (previous_palette_entry_flag[idx]){ | |
| S610 — last_previous_entry_flag | ae(v) |
| if (last_previous_entry_flag) | |
| S620 — idx = previous_palette_size | |
| for(cIdx = 0;cIdx < 3;cIdx++) | |
| palette_entries[cIdx][numPredPreviousPalette]= previousPaletteEntries[cIdx][idx] | |
| numPredPreviousPalette++ | |
| ... | |
| } | |
| } | |
| if(numPredPreviousPalette < max_palette_size) | |
| palette_num_signalled_entries | ae(v) |
| for(cIdx = 0;cIdx < 3;cIdx++) | |
| for(i=0; i < palette_num_signalled_entries; i++) | |
| palette_entries[cIdx][numPredPreviousPalette+i] | ae(v) |
| palette_size = numPredPreviousPalette + palette_num_signalled_entries | |
| } | |
| ... | |
| } | |

METHOD AND APPARATUS FOR PROCESSING VIDEO SIGNAL

CROSS REFERENCE TO RELATED APPLICATIONS

This application is a National Stage Patent Application of PCT International Patent Application No. PCT/KR2015/010282 (filed on Sep. 30, 2015) under 35 U.S.C. § 371, which claims priority to Korean Patent Application Nos. 10-2014-0132470 (filed on Oct. 1, 2014) and 10-2014-0135514 (filed on Oct. 8, 2014), the teachings of which are incorporated herein in their entireties by reference.

TECHNICAL FIELD

The present invention relates to a method and a device for processing a video signal.

BACKGROUND ART

Demands for high-resolution, high-quality images such as High Definition (HD) images and Ultra High Definition (UHD) images have recently increased in various fields of applications. As video data has a higher resolution and higher quality, the video data is larger in amount than traditional video data. Therefore, if video data is transmitted on an existing medium such as a wired/wireless wideband circuit or stored in an existing storage medium, transmission cost and storage cost increase. To avert these problems encountered with higher-resolution, higher-quality video data, high-efficiency video compression techniques may be used.

There are a variety of video compression techniques including inter-picture prediction in which pixel values included in a current picture are predicted from a picture previous to or following the current picture, intra-picture prediction in which pixel values included in a current picture are predicted using pixel information in the current picture, and entropy encoding in which a short code is assigned to a more frequent value and a long code is assigned to a less frequent value. Video data may be compressed effectively and transmitted or stored, using such a video compression technique.

Along with the increasing demands for high-resolution videos, demands for three-dimensional (3D) video content as a new video service have been increasing. A video compression technique for effectively providing HD and UHD 3D video content is under discussion.

DISCLOSURE

Technical Problem

It is an object of the present invention to provide a method and apparatus for predicting or restoring a video signal based on an index string matching technique in encoding/decoding a video signal.

It is an object of the present invention to provide a method and apparatus for predicting or restoring a video signal based on a sample string matching technique in encoding/decoding a video signal.

Technical Solution

A video signal decoding method and apparatus according to the present invention determines, based on a sample string matching technique, a length of a current string to be decoded in a current block and determines a reference string based on at least one of a length of the current string or a string vector relating to the current string, and predict the current string using the determined reference string.

In the method and apparatus for decoding a video signal according to the present invention, the length of the current string is determined based on the encoded string length information.

In the method and apparatus for decoding a video signal according to the present invention, the step of determining the length of the current string may include obtaining a string row flag (string_same_row_flag) for the current string from a bitstream, obtaining, based on the string row flag, the string last vector information for specifying the position of the last sample of the current string from the bitstream, and determining a length of the current string based on the position of the first sample of the current string and the obtained string last vector information.

In the method and apparatus for decoding a video signal according to the present invention, the string row flag indicates whether the first sample and the last sample of the current string belong to the same row.

In the method and apparatus for decoding a video signal according to the present invention, the string vector indicates a position difference between a top-left sample of a current block including the current string and a top-left sample of a reference block including the reference string.

In the method and apparatus for decoding a video signal according to the present invention, the reference string is determined as a string at the same position as the current string in a reference block specified by the string vector.

A video signal encoding method and apparatus according to the present invention determines, based on a sample string matching technique, a length of a current string to be encoded in a current block, determines a reference string based on at least one of the length of the current string or a string vector relating to the current string, and predicts the current string using the determined reference string.

In the method and apparatus for encoding a video signal according to the present invention, the length of the current string is determined based on the string length information.

In the method and apparatus for encoding a video signal according to the present invention, the string length information is encoded with most significant bit information and offset information regarding the length of the current string.

In the method and apparatus for encoding a video signal according to the present invention, determining the length of the current string may include determining whether the first and last samples of the current string belong to the same row, and encoding the string last vector information for specifying the position of the last sample of the current string if the first sample and the last sample of the current string belong to the same row.

In the method and apparatus for encoding a video signal according to the present invention, the string vector indicates a position difference between a top-left sample of a current block including the current string and a top-left sample of a reference block including the reference string.

In the method and apparatus for encoding a video signal according to the present invention, the reference string is determined as a string at the same position as the current string in a reference block specified by the string vector.

Advantageous Effects

According to the present invention, a palette index may be effectively encoded/decoded based on an index string matching technique.

According to the present invention, prediction/restoration of one or more sample arrays may be effectively performed based on a sample string matching technique.

DESCRIPTION OF DRAWINGS

FIG. 6 illustrates a method for restrictively obtaining a reuse flag based on a last entry flag (last_previous_entry_flag), according to an embodiment of the present invention.

BEST MODE FOR CARRYING OUT THE INVENTION

Figure 1:
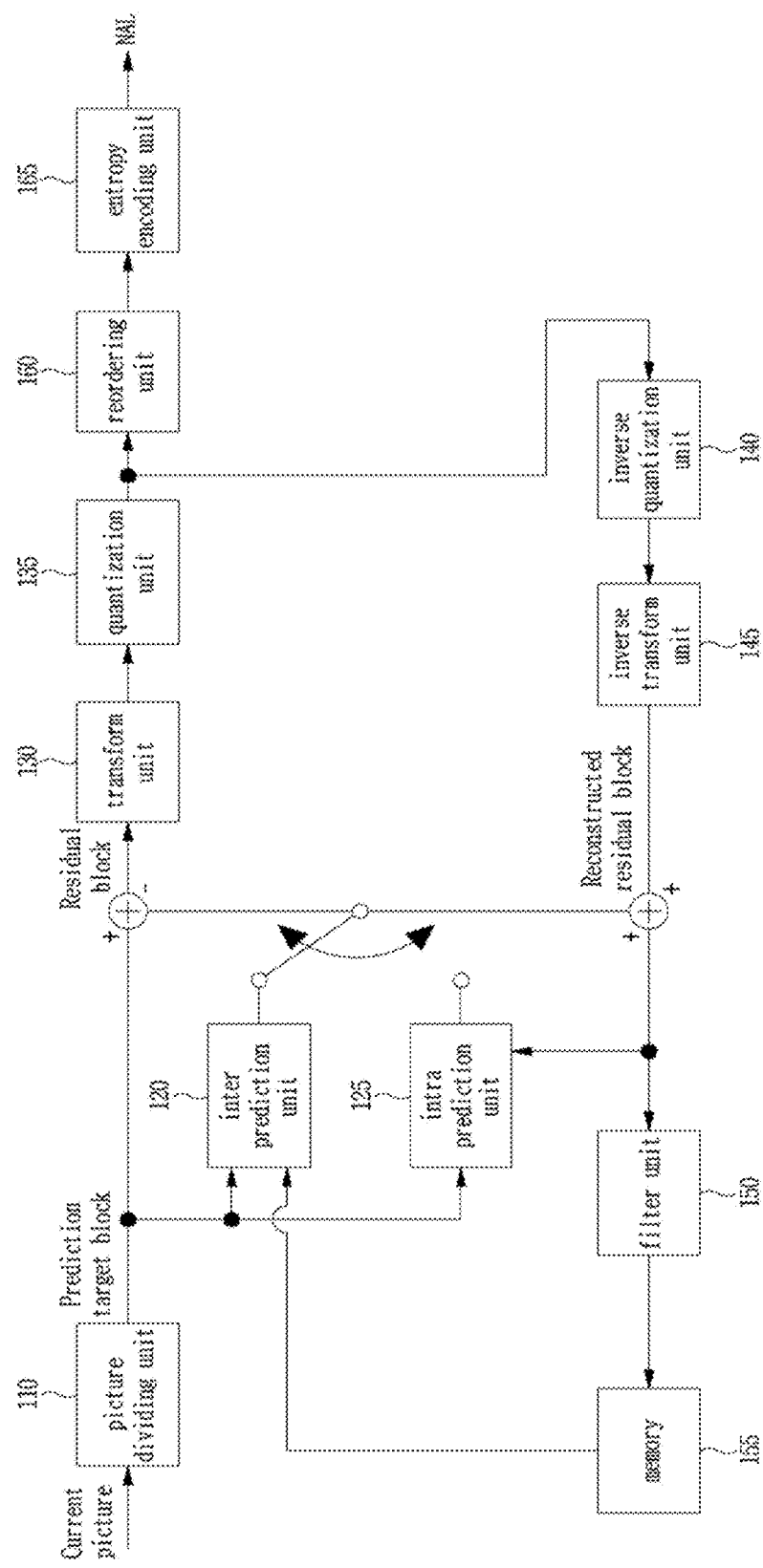
FIG. 1 is a block diagram illustrating a video encoding apparatus according to an embodiment of the present invention.

A video signal decoding method and apparatus according to the present invention determines, based on a sample string matching technique, a length of a current string to be decoded in a current block and determines a reference string based on at least one of a length of the current string or a string vector relating to the current string, and predict the current string using the determined reference string.

In the method and apparatus for decoding a video signal according to the present invention, the length of the current string is determined based on the encoded string length information.

In the method and apparatus for decoding a video signal according to the present invention, the step of determining the length of the current string may include obtaining a string row flag (string_same_row_flag) for the current string from a bitstream, obtaining, based on the string row flag, the string last vector information for specifying the position of the last sample of the current string from the bitstream, and determining a length of the current string based on the position of the first sample of the current string and the obtained string last vector information.

In the method and apparatus for decoding a video signal according to the present invention, the string row flag indicates whether the first sample and the last sample of the current string belong to the same row.

In the method and apparatus for decoding a video signal according to the present invention, the string vector indicates a position difference between a top-left sample of a current block including the current string and a top-left sample of a reference block including the reference string.

In the method and apparatus for decoding a video signal according to the present invention, the reference string is determined as a string at the same position as the current string in a reference block specified by the string vector.

A video signal encoding method and apparatus according to the present invention determines, based on a sample string matching technique, a length of a current string to be encoded in a current block, determines a reference string based on at least one of the length of the current string or a string vector relating to the current string, and predicts the current string using the determined reference string.

In the method and apparatus for encoding a video signal according to the present invention, the length of the current string is determined based on the string length information.

In the method and apparatus for encoding a video signal according to the present invention, the string length information is encoded with most significant bit information and offset information regarding the length of the current string.

In the method and apparatus for encoding a video signal according to the present invention, determining the length of the current string may include determining whether the first and last samples of the current string belong to the same row, and encoding the string last vector information for specifying the position of the last sample of the current string if the first sample and the last sample of the current string belong to the same row.

In the method and apparatus for encoding a video signal according to the present invention, the string vector indicates a position difference between a top-left sample of a current block including the current string and a top-left sample of a reference block including the reference string.

In the method and apparatus for encoding a video signal according to the present invention, the reference string is determined as a string at the same position as the current string in a reference block specified by the string vector.

MODE FOR CARRYING OUT THE INVENTION

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a video encoding apparatus according to an embodiment of the present invention.

Referring to FIG. 1, the video encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the video encoding apparatus, and does not mean that each element is composed of separate hardware or one software configuration unit. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide an input picture into at least one processing unit. Here, the processing unit may be a prediction unit (PU), a transform unit (TU) or a coding unit (CU). The picture dividing unit 110 may divide one picture into a plurality of combinations of CUs, PUs and TUs and encode the picture by selecting one combination of CUs, PUs and TUs on the basis of a predetermined criterion (for example, a cost function).

For example, one picture may be partitioned into a plurality of CUs. A recursive tree structure, such as a quad tree structure, may be used to partition a picture into CUs. A CU, for which a picture or a CU of a maximum size may be as root, may be partitioned into sub-coding units with as many child nodes as the partitioned CUs. A CU which is not partitioned any more in accordance with a predetermined limitation is a leaf node. That is, assuming that a CU may be partitioned into quadrants only, a single CU may be partitioned into at most four different CUs.

In the embodiments of the invention, a CU may be used to refer to not only a unit of encoding but also a unit of decoding.

A PU may be partitioned into at least one square or rectangular form with the same size in a CU. For PUs partitioned from a same CU, a PU may have different shape and/or size from another PU.

When a PU for intra prediction is generated based on a CU and the CU is not a minimum CU, the CU may be subjected to intra prediction without being partitioned into plural PUs (N×N).

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luma pixels, a DCT-based 8-tap interpolation filter with a variable filter coefficient may be used to generate pixel information less than or equal to an integer pixel in a unit of a ¼ pixel. In the case of chroma pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, and advanced motion vector prediction (AMVP) mode, intra block copy mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting luma information and a mode for predicting chroma information may be different from each other. Further, intra prediction mode information used to obtain luma information or predicted luma signal information may be used to predict chroma information.

When a PU and a TU have the same size, intra prediction on the PU may be performed based on a left pixel, an upper-left pixel and an upper pixel of the PU. On the other hand, when a PU and a TU have different sizes, intra prediction may be performed by using reference pixels which are determined based on the TU. Intra prediction using N×N partitioning may be performed only for a minimum CU.

In the intra prediction method, a predicted block may be generated by applying an adaptive intra smoothing (AIS) filter to the reference pixels according to the prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

A residual block including residual information may be generated. The residual information is a difference between the original block of the PU and the predicted block of a PU generated by the prediction units 120 and 125. The generated residual block may be input to the transform unit 130.

The transform unit 130 may transform the residual block using a transform method such as Discrete Cosine Transform (DCT), Discrete Sine Transform (DST) or KLT. The residual block includes information on the residual between the PU generated by the prediction units 120 and 125 and the original block. A transform method to be used to transform the residual block may be determined among DCT, DST and KLT on the basis of the information on the intra prediction mode of the PU which is used to generate the residual block.

The quantization unit 135 may quantize values transformed into a frequency domain by the transform unit 130. A quantization coefficient may be changed depending on a block or importance of an image. Values output from the quantization unit 135 may be provided to the dequantization unit 140 and the rearrangement unit 160.

The rearrangement unit 160 may rearrange quantized coefficients.

The rearrangement unit 160 may change a two-dimensional (2D) block of coefficients into a one-dimensional (1D) vector of coefficients through coefficient scanning. For example, the rearrangement unit 125 may change a 2D block of coefficients into a 1D vector of coefficients by scanning from DC coefficients to coefficients of a high frequency domain using zigzag scanning. Vertical scanning for scanning a 2D block of coefficients in a vertical and horizontal scanning for scanning a 2D block of coefficients in a horizontal direction may be used depending on a size of a TU and an intra prediction mode, instead of zigzag scanning. That is, a scanning method may be selected based on the size of the TU and the intra prediction mode, among zigzag scanning, vertical scanning, and horizontal scanning.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information on a CU, prediction mode information, partitioning unit information, PU information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The dequantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the dequantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
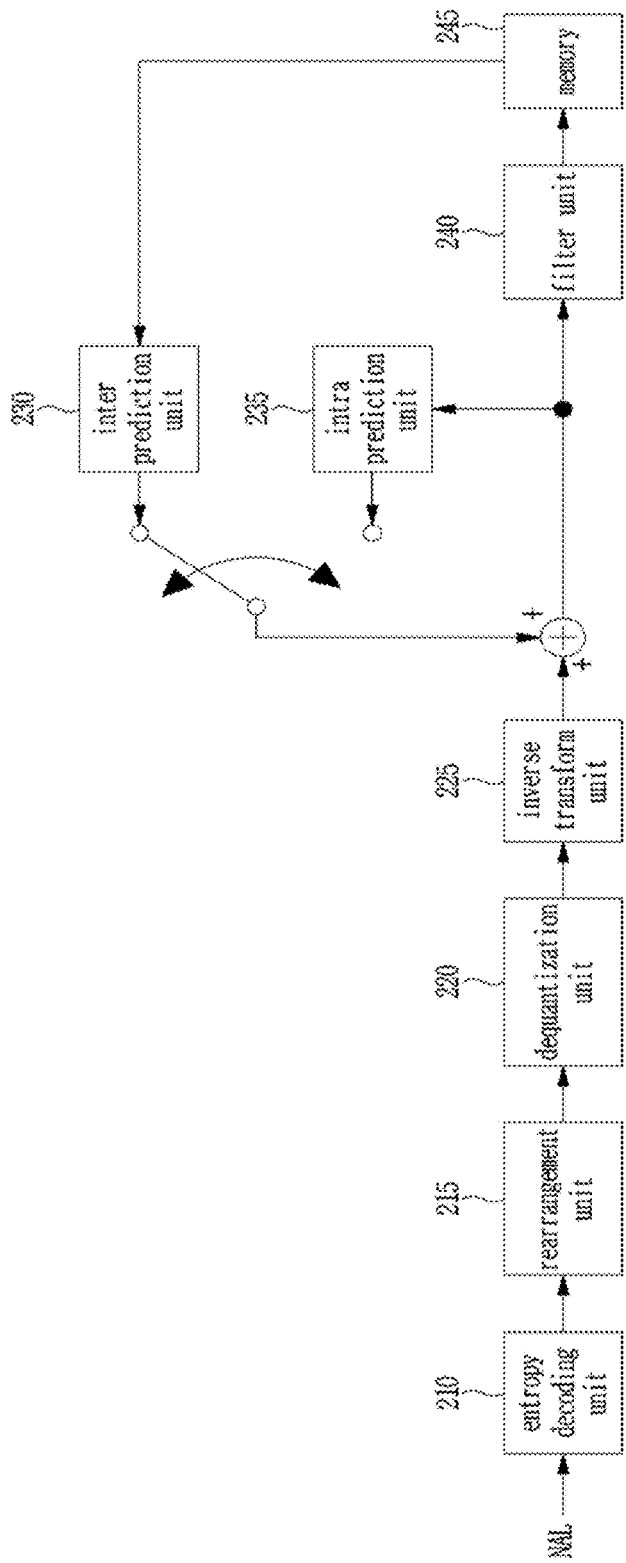
FIG. 2 is a block diagram illustrating a video decoding apparatus according to an embodiment of the present invention.

FIG. 2 is a block diagram illustrating a video decoding apparatus according an exemplary embodiment of the present invention.

Referring to FIG. 2, the video decoding apparatus 200 may include an entropy decoding unit 210, a rearrangement unit 215, a dequantization unit 220, an inverse transform unit 225, prediction units 230 and 235, a filter unit 240, and a memory 245.

When a video bitstream is input from the video encoding apparatus, the input bitstream may be decoded according to an inverse process of the video encoding process performed in the video encoding apparatus.

The entropy decoding unit 210 may perform entropy decoding according to an inverse process of the entropy encoding process by the entropy encoding unit of the video encoding apparatus. For example, various methods, such as exponential Golomb coding, CAVLC or CABAC, may be used for entropy encoding, corresponding to the method used by the video encoding apparatus.

The entropy decoding unit 210 may decode information associated with intra prediction and inter prediction performed by the encoding apparatus.

The rearrangement unit 215 may perform rearrangement on the bitstream entropy-decoded by the entropy decoding unit 210 on the basis of the rearrangement method of the encoding unit. The rearrangement unit 215 may reconstruct and rearrange coefficients of a 1D vector form into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter provided from the encoding apparatus and the rearranged coefficients of the block.

The inverse transform unit 225 may perform inverse transform performed by the transform unit (that is, inverse DCT, inverse DST or inverse KLT) on a result of quantization performed by the video encoding apparatus. Inverse transform may be performed on the basis of a transfer unit determined by the video encoding apparatus. The transform unit 225 of the video decoding apparatus may selectively perform the transform scheme (e.g., DCT, DST, KLT) depending on a plurality of information elements, such as a prediction method, a size of the current block and a prediction direction, etc.

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245

Similarly to the operation of the video encoding apparatus as described above, when a PU and a TU have the same size, intra prediction on the PU is performed based on left pixels, an upper-left pixel and upper pixels of the PU. On the other hand, when a PU and a TU have different sizes, intra prediction may be performed using reference pixels which are determined based on the TU. Intra prediction using N×N partitioning may be used only for a minimum CU.

The prediction units 230 and 235 may include a PU determination unit, an inter prediction unit and an intra prediction unit. The PU determination unit may receive a variety of information, such as PU information, prediction mode information on an intra prediction method and motion prediction-related information on an inter prediction method, etc. from the entropy decoding unit 210, may determine a PU for a current CU. The PU determination unit may determine which of the inter prediction and the intra prediction is performed on the PU. An inter prediction unit 230 may perform inter prediction on a current PU on the basis of information on at least one picture among a previous picture and a subsequent picture of a current picture including the current PU. An inter prediction unit 230 may use information necessary for inter prediction for the current PU provided from the video encoding apparatus. The inter prediction may be performed on the basis of the information of the pre-reconstructed partial region in the current picture including the current PU.

In order to perform inter prediction, it may be determined, in an unit of a CU, whether a motion prediction method for a PU included in the CU is a skip mode, a merge mode, an AMVP mode or intra block copy mode.

An intra prediction unit 235 may generate a prediction block on the basis of pixel information in a current picture. When a PU is a PU for which intra prediction is performed, intra prediction may be performed based on intra prediction mode information on the PU provided from the video encoding apparatus. The intra prediction unit 235 may include an AIS (Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current PU. AIS filtering may be performed on the reference pixels of the current block using the prediction mode for the PU and information on the AIS filter provided from the video encoding apparatus. When the prediction mode for the current block is a mode not performing MS filtering, the AIS filter may not be applied.

When the prediction mode for the PU indicates a prediction mode of performing intra prediction on the basis of pixel values obtained by interpolating the reference pixels, the reference pixel interpolation unit may generate reference pixels in a unit of a fractional pixel less than an integer pixel (i.e. full pixel) by interpolating the reference pixels. When the prediction mode for the current PU indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The video encoding apparatus may provide information on whether the deblocking filter is applied to a corresponding block or picture, and information on which of a strong filter and a weak filter is applied when the deblocking filter is used. The deblocking filter of the video decoding apparatus may be provided with information on the deblocking filter from the video encoding apparatus and may perform deblocking filtering on a corresponding block.

The offset unit may apply offset to the reconstructed picture on the basis of information on an offset type and offset value applied to the picture in the encoding process.

The ALF may be applied to a CU on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

As described above, in the embodiments of the invention, the term "coding unit" is used as an encoding unit for a convenience of descriptions. However, the term "coding unit" may be also used as a unit of decoding.

Figure 3:
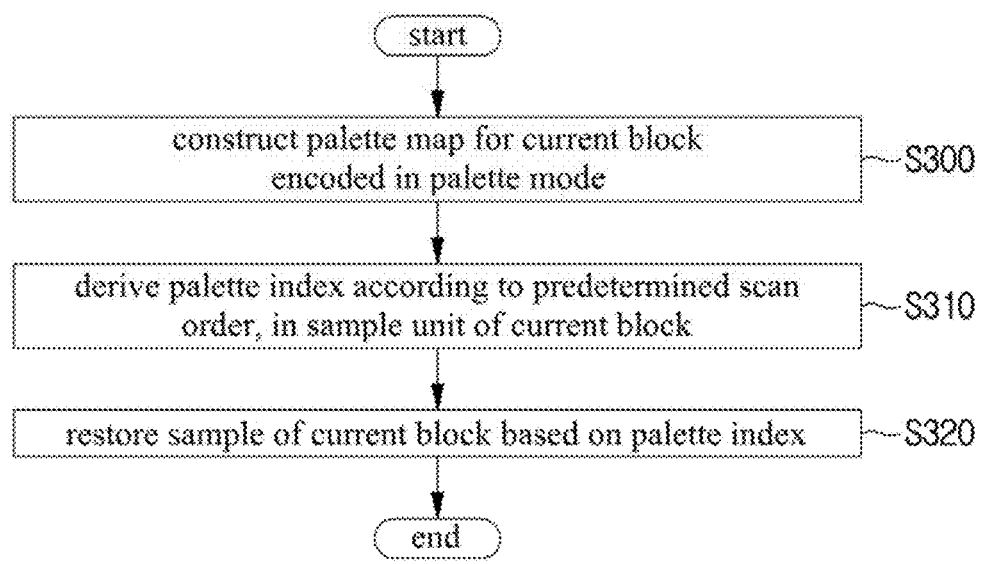
FIG. 3 illustrates a method of restoring a current block based on a palette mode according to an embodiment of the present invention.

FIG. 3 illustrates a method of restoring a current block based on a palette mode according to an embodiment of the present invention.

In the case of an image including an animation or a graphic, it may happen that all or a part of the image is composed of only a specific pixel value. In this case, a method of encoding a specific pixel value constituting the area may be used without using an inter prediction or intra prediction method, which is called a palette mode. The palette mode may be applied in a block unit (for example, a coding unit, a prediction unit). For this purpose, flag information (palette_mode_flag) indicating whether the palette mode is used may be signaled on a block basis.

Referring to FIG. 3, a palette map for a current block encoded in a palette mode may be constructed (S300).

The palette map may comprise at least one palette entry and a map index identifying each palette entry. The palette map of the current block can be derived from a palette map of the previous block (hereinafter referred to as a previous palette map). Here, the previous block may mean a block that has been encoded or decoded before the current block.

The palette entry of the current block may comprise at least one of a predicted palette entry or a signaled palette entry. The current block may use all or a part of the palette entries used by the previous block. A predicted palette entry may be representative of the palette entry reused in the current block among the palette entries used in the previous block.

Specifically, the current block may use the same palette map as the previous block. For this, a flag (palette_share_flag) indicating whether the current block uses the same palette map as the previous block may be signaled. Here, the same palette map means that the size of the palette map (or the number of palette entries included in the palette map) is the same and the palette entries included in the palette map are the same. When the value of palette_share_flag is 1, the current block uses the same palette map as the previous block. When the value of the palette_share_flag is 0, the current block may use the palette map in which at least one of the size of the palette map or the palette entries included in the palette map is different from that of the neighboring block.

Alternatively, the current block may selectively use some palette entries of the previous palette map. For this purpose, a flag (previous_palette_entry_flag, hereinafter referred to as a reuse flag) for specifying whether the palette entry is reused may be used. Specifically, the value of the reuse flag is assigned to each of the palette entries of the previous palette map. The reuse flag (previous_palette_entry_flag [i]) indicates that the palette entry corresponding to the map index i in the previous palette map is reused or not. For example, if the value of the reuse flag is 1, the palette entry corresponding to the map index i in the previous palette map is reused in the palette map of the current block. Otherwise, it is not reused. A palette map of the current block may be constructed by extracting palette entries having a reuse flag equal to 1 from the previous pallet map and sequentially arranging the palette entries. The reuse flag may be signaled in the form of a flag encoded for each palette entry, or may be signaled in the form of a binary vector based on a run encoding, which will be described in detail with reference to FIG. 4 to FIG. 6.

In order to selectively use some of the palette entries in the palette map of the previous block, a re-use variable array (predictor_palette_entry_reuse_flag) for specifying whether the previous palette entry is reused and a syntax palette_predictor_run value for specifying the number of reuse variables equal to 0 between non-zero reuse variables in the reuse variable array may be used.

In addition, the palette map of the current block may further include a signaled palette entry signaled from the bitstream. Here, the signaled palette entry includes a palette entry that is not included in the previous palette map, among the palette entries used by the current block.

Referring to FIG. 3, a palette index may be derived according to a predetermined scan order in a sample unit (or pixel unit) of the current block (S310).

As the scan order of the present invention, a horizontal scan, a vertical scan, a horizontal traverse scan, a vertical traverse scan, or the like may be used, and this will be described in detail with reference to FIG. 9.

The first flag information (first_palette_idx_flag) indicates whether the current index is a palette index used in the current decoding buffer. The palette index information (palette_idx) is encoded to specify a palette index used in the current block. A palette index of the current block may be derived using at least one of first flag information, palette index information, palette index run information (palette_idx_run), or index distance information (distance_minus1_from_used_idx). This method will be referred to as an index string matching technique. Here, the palette index run information may mean the number of the remaining palette indices excluding the palette index which is generated first, among consecutive palette indices having the same value. Alternatively, the palette index run information may mean a position difference or a scan order difference between the first palette index and the last palette index among consecutive palette indices having the same value. The index distance information may be encoded to specify a position of a previous sample having the same palette index as the current sample. Here, the previous sample may be a sample having a scan order earlier than the current sample, and a sample having the last scan order among the samples having the same palette index as the current sample.

A method of encoding/decoding the palette index of the current block based on the index string matching technique will be described in detail with reference to FIGS. 7 and 8.

Referring to FIG. 3, a sample of a current block may be restored based on the palette index derived in step S310 (S320).

Specifically, the sample of the current block may be restored based on the palette map of the current block configured in step S300 and the palette index derived in step S310. A palette entry having a map index of the same value as the derived palette index is extracted from the palette map of the current block, and then the sample of the current block may be restored using the palette entry. For example, the value of the palette entry extracted from the palette map may be set to the predicted value or the restored value of the sample of the current block.

However, the value of the derived palette index may be equal to the number of palette entries constituting the palette map of the current block. In this case, the sample of the current block can be restored by using the palette entry of the palette map configured in step S300. That is, since the map index of the palette map has a value between 0 (the number of palette entries–1), the value of the derived palette index equal to the number of palette entries means that there is no palette entry corresponding to the derived palette index in the palette map configured in step S300. In this way, when a sample having a palette index of the same value as the number of palette entries in the current block exists, the sample may be determined to be encoded in an escape mode (ESCAPE MODE). Here, the escape mode may refer to a method of restoring a sample value based on a palette escape value that is additionally signaled, instead of using the palette entry of the palette map constructed in step S300. Thus, a sample having a palette index equal to the number of palette entries may be restored using the additionally signaled palette escape value.

On the other hand, the escape mode may be adaptively used based on the number of palette entries constituting the palette map of the current block. Here, the number of palette entries may be derived as the sum of the number of palette entries predicted from the palette map of the previous block and the number of signaled palette entries. The predicted palette entry and the signaled palette entry are as described with reference to FIG. 3. For example, if the number of palette entries used by the current block is greater than zero (e.g., if the number of palette entries is one), restoring at least one sample of the current block based on the escape mode may be allowed. Conversely, if the number of palette entries used by the current block is zero, the current block is not allowed to be restored based on the escape mode.

Figure 4:
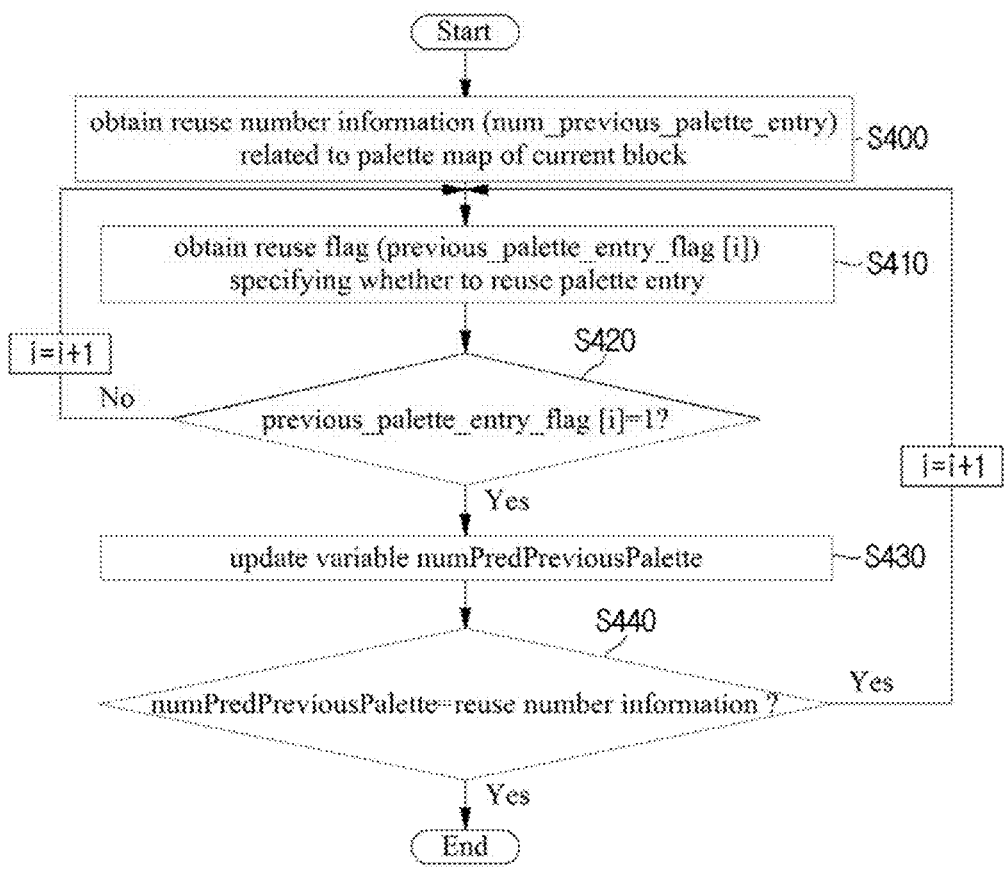
FIG. 4 illustrates a method of restrictively signaling of a reuse flag (previous_palette_entry_flag) according to an embodiment of the present invention.

FIG. 4 illustrates a method of signaling of a reuse flag (previous_palette_entry_flag) according to an embodiment of the present invention.

Referring to FIG. 4, the reuse number information (num_previous_palette entry) related to the palette map of the current block may be obtained from the bitstream (S400).

Here, the reuse number information may mean information encoded to indicate the number of palette entries reused as palette entries of the current block among the palette entries of the previous palette map.

A reuse flag (previous_palette_entry_flag [i]) specifying whether or not the i-th palette entry is to be reused may be obtained from the bitstream (S410).

The reuse flag is signaled by the size of the previous palette map (or the number of palette entries included in the previous palette map). Here, i corresponds to a map index that identifies the palette entry of the previous palette map, and the value of i is in a range 0 to (size of the previous palette map-1).

It may be checked whether the value of the reuse flag obtained in step S410 is 1 (S420). As a result of checking, if the value of the reuse flag is 1, a variable numPredPreviousPalette indicating the number of reuse flags equal to 1 may be updated (S430). For example, the value of the variable numPredPreviousPalette may be increased by one.

On the other hand, if the value of the reuse flag is 0, a reuse flag (previous_palette_entry_flag [i+1]) specifying whether to reuse the (i+1)-th palette entry may be obtained from the bitstream (S410).

It is possible to compare whether the variable numPredPreviousPalette value increased in step S430 and the reuse number information obtained in step S400 are the same (S440).

If the variable numPredPreviousPalette is not equal to the number information obtained in step S400, a reuse flag (previous_palette_entry_flag [i+1]) specifying whether to reuse the (i+1)-th palette entry may be obtained from the bitstream (S410). However, if the variable numPredPreviousPalette is equal to the number information obtained in step S400, a palette entry having a map index greater than the i value may not be used as a palette entry of the current block. For this, if the variable numPredPreviousPalette is equal to the number information obtained in step S400, the value of i may be derived to be equal to or larger than the size of the previous palette map. For example, the value of i may be derived by adding 1 to the size of the previous palette map. Thus, by setting the value of i to be equal to or greater than the size of the previous palette map, the reuse flag associated with the (i+1)-th palette entry may not be signaled.

Figure 5:
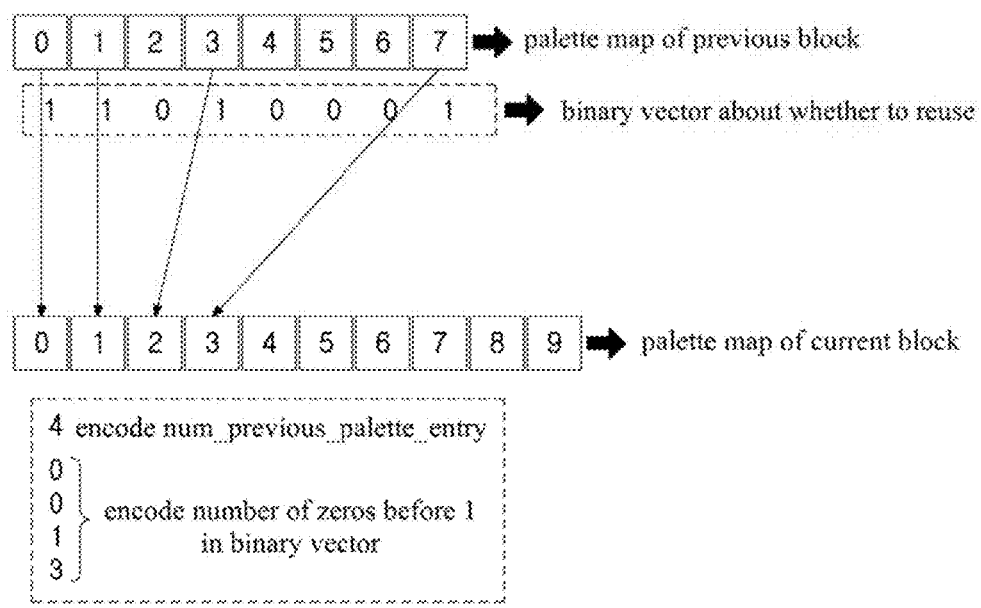
FIG. 5 illustrates a method of signaling a reuse flag in the form of a binary vector based on a run encoding, according to an embodiment of the present invention.

FIG. 5 illustrates a method of signaling a reuse flag in the form of a binary vector based on a run encoding, according to an embodiment of the present invention.

In the present embodiment, it is assumed that the palette map of the previous block uses eight palette entries having a map index of 0 to 7.

For each of the palette entries of the previous block with index 0 to 7, the video encoding apparatus determines whether the palette entry is reused as a palette entry of the current block. If the palette entry is reused as a palette entry of the current block, the value of the reuse flag for the palette entry may be set to be 1, and otherwise, it may be set to be 0. For example, as shown in FIG. 5, when the palette entries of 0, 1, 3, and 7 among the palette entries of the previous block are reused as palette entries of the current block and the remaining palette entries are not reused, a binary vector represented by 11010001 may be generated.

Then, at least one of the number of 1's in the binary vector (i.e., the number of palette entries reused as a palette entry of the current block in the previous block) or the number of zeros earlier than 1 in the binary vector is encoded, and then it may be signaled to the video decoding apparatus. For example, since the number of 1's in the binary vector is 4, 4 may be encoded as the number of palette entries of the previous block reused as the palette entry of the current block. In addition, the number of zeros preceding the 1 in the binary vector, that is, 0, 0, 1, and 3, may be sequentially encoded.

The video decoding apparatus may receive, from the video encoding apparatus, at least one of information (num_previous_palette_entry) about the number of palette entries of a previous block reused as palette entries of the current block or information (palette_entry_run) about the number of zeros preceding the 1 in the binary vector, and then construct a palette map of the current block by using it.

For example, the video decoding apparatus successively extracts information (palette_entry_run) about the number of zeros preceding the 1 in the binary vector, that is, 0, 0, 1, and 3, from the bitstream. The binary vector indicating whether to reuse the palette entry of a previous block, that is, 11010001 may be restored by using the extracted information. When a value of 1 is generated in the process of restoring the binary vector, the palette entry of the previous block corresponding to the value 1 may be inserted into the palette map of the current block. Through this process, a palette map of the current block may be constructed by selectively reusing some palette entries from the palette map of the previous block.

FIG. 6 illustrates a method of obtaining a reuse flag in a limited manner based on a last entry flag (last_previous_entry_flag) according to an embodiment of the present invention.

Referring to FIG. 6, a reuse flag (previous_palette_entry_flag [idx]) may be obtained in consideration of the size of the palette map of the previous block (S600).

The reuse flag may indicate whether the palette entry corresponding to the current map index idx in the palette map of the previous block is reused as the palette entry of the current block. The reuse flag may be obtained within a range where the current map index idx is smaller than the size of the palette map of the previous block (or the number of palette entries constituting the palette map of the previous block).

The last entry flag (last_previous_entry_flag) may be obtained based on the reuse flag obtained in step S600 (S610).

Specifically, if the value of the reuse flag is 1, the last entry flag is extracted from the bitstream, and if the value of the reuse flag is 0, the last entry flag is not extracted from the bitstream.

Here, the last entry flag may indicate whether the palette entry corresponding to the current map index idx is the last palette entry of the palette entries of the previous block that are reused as the palette entry of the current block. For example, if the value of the last entry flag is 1, a palette entry having a map index value greater than the current map index idx is not reused as a palette entry of the current block. On the other hand, if the value of the last entry flag is 0, at least one of the palette entries having the map index value greater than the current map index idx may be reused as the palette entry of the current block.

The value of the current map index idx may be updated to be a predetermined value based on the last entry flag obtained in step S610 (S620).

For example, if the value of the last entry flag is 1, the value of the current map index idx may be updated to be the same value as the size of the palette map of the previous block. In this case, as described above, as the reuse flag is extracted within the size range of the palette map of the previous block, the reuse flag is not signaled for the palette entry having the map index value greater than the current map index idx.

On the other hand, when the value of the last entry flag is 0, it means that at least one of palette entries having a map index greater than the current map index idx may be reused as a palette entry of the current block. Thus, the current map index idx may be increased by one. That is, the current map index idx value is updated to (idx+1), and steps S600 and S610 may be repeated until the value of the last entry flag reaches 1.

Through the above-described process, the reuse flag of the present invention may be limitedly signaled based on the value of the last entry flag.

Figure 7:
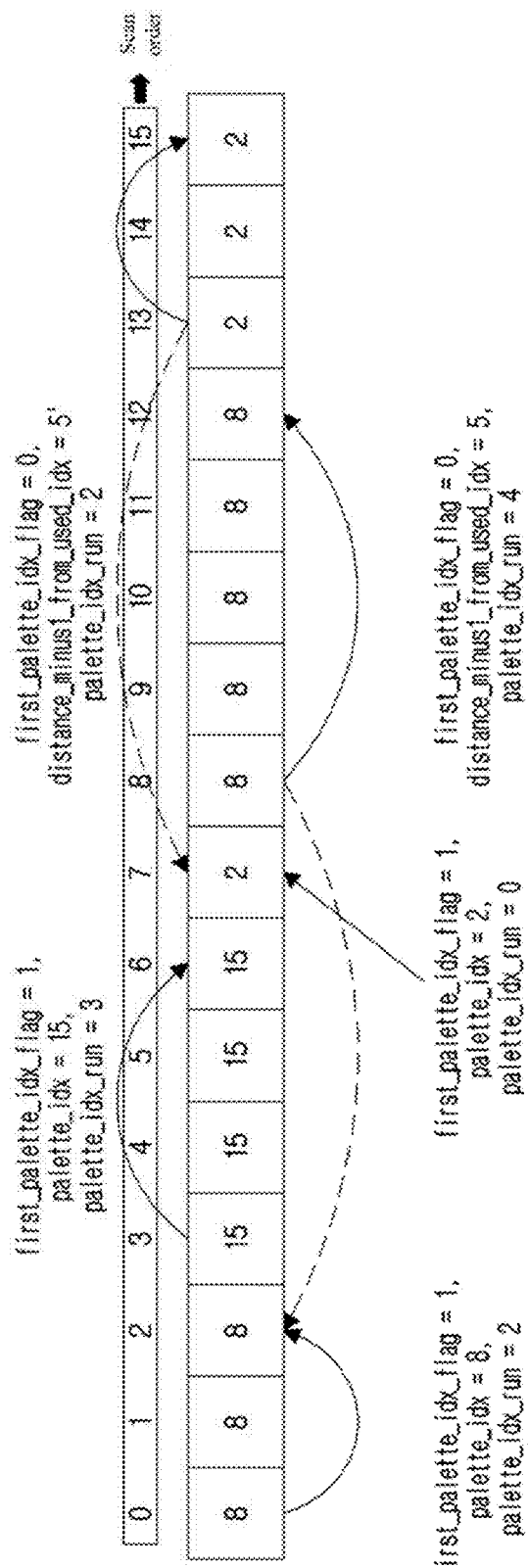
FIG. 7 illustrates a method of encoding a palette index of a current block based on an index string matching technique according to an embodiment of the present invention.

FIG. 7 illustrates a method of encoding a palette index of a current block based on an index string matching technique according to an embodiment of the present invention.

In the present embodiment, it is assumed that the current block is a 4×4 block, and is composed of 16 samples. As shown in FIG. 7, the palette indices related to the current block may be represented by an one-dimensional array according to a predetermined scan order. Here, it is assumed that the current block has an one-dimensional palette index array like {8, 8, 8, 15, 15, 15, 15, 2, 8, 8, 8, 8, 8, 2, 2, 2}.

The palette index of the current block is encoded according to a predetermined scan order. At this time, a palette index to be encoded is generated first in a sample having a scan order 0 (hereinafter referred to as a 0th sample). This may mean that the palette index 8 of the 0th sample is a palette index which is not used in the current decoding buffer. Accordingly, the value of the first flag information (first_palette_idx_flag) indicating whether a current index is a palette index used in the current decoding buffer may be encoded as 1.

Then, since the palette index of the 0th sample is 8, the palette index information (palette_idx) of the 0th sample may be encoded as 8. Then, the value of the palette index run information (palette_idx_run) indicating the number of the palette indices of the same value continuously occurring after the 0th sample may be encoded as 2. In this manner, the palette index from the 0th sample to the 2nd sample may be encoded using the first flag information, the palette index information, and the palette index run information.

Similarly, the 3rd sample has a palette index of 15, which is not a palette index used in the current decoding buffer. Therefore, the value of the first flag information (first_palette_idx_flag) is encoded as 1, and the palette index information (palette_idx) of the 3rd sample is encoded as 15. Since there are three successive palette indices of the same value after the 3rd sample, the value of the palette index run information (palette_idx_run) is encoded as 3.

On the other hand, the 8th sample has the palette index of 8, and the palette index 8 corresponds to the palette index used in the current decoding buffer (especially, the 0th sample to the 2nd sample). In this case, the value of the first flag information (first_palette_idx_flag) is encoded as 0 and instead the index distance information (distance_minus1_from_used_idx) may be encoded to specify the position of the sample where the palette index of 8 is used. As described above, the index distance information (distance_minus1_from_used_idx) is encoded to specify the position of the previous sample having the same palette index as the current sample, where the previous sample is a sample having a scan order earlier than the current sample. The previous sample may mean a sample having a last scan order, among samples having the same palette index as the current sample. For example, the index distance information may be encoded by subtracting 1 from the position difference between the 8th sample and the 2nd sample where the palette index of 8 is used previously. Then, since there are four palette indices of the same value successively after the 8th sample, the value of the palette index run information (palette_idx_run) may be encoded as 4. In this manner, the palette indices from the 8th sample to the 12th sample may be encoded using the first flag information, the index distance information, and the palette index run information. It is needless to say that the palette indices from the 13th sample to the 15th sample may be encoded in the same manner.

As described above, the value of the index distance information and/or the palette index run information may be encoded as it is, or may be encoded with two components that is, most significant bit and offset to improve coding efficiency. Here, the offset may mean the difference between the value of the index distance information (or palette index run information) and the value corresponding to the most significant bit of the index distance information (or pallet index run information).

For example, when the value of the index distance information is 17, the most significant bit of the index distance information is 4, and the offset becomes 1, which is the difference the index distance information equal to 17 and 16 corresponding to the most significant bit equal to 4. Therefore, the value 17 of the index distance information may be encoded with the most significant bit of 4 and the offset of 1.

Figure 8:
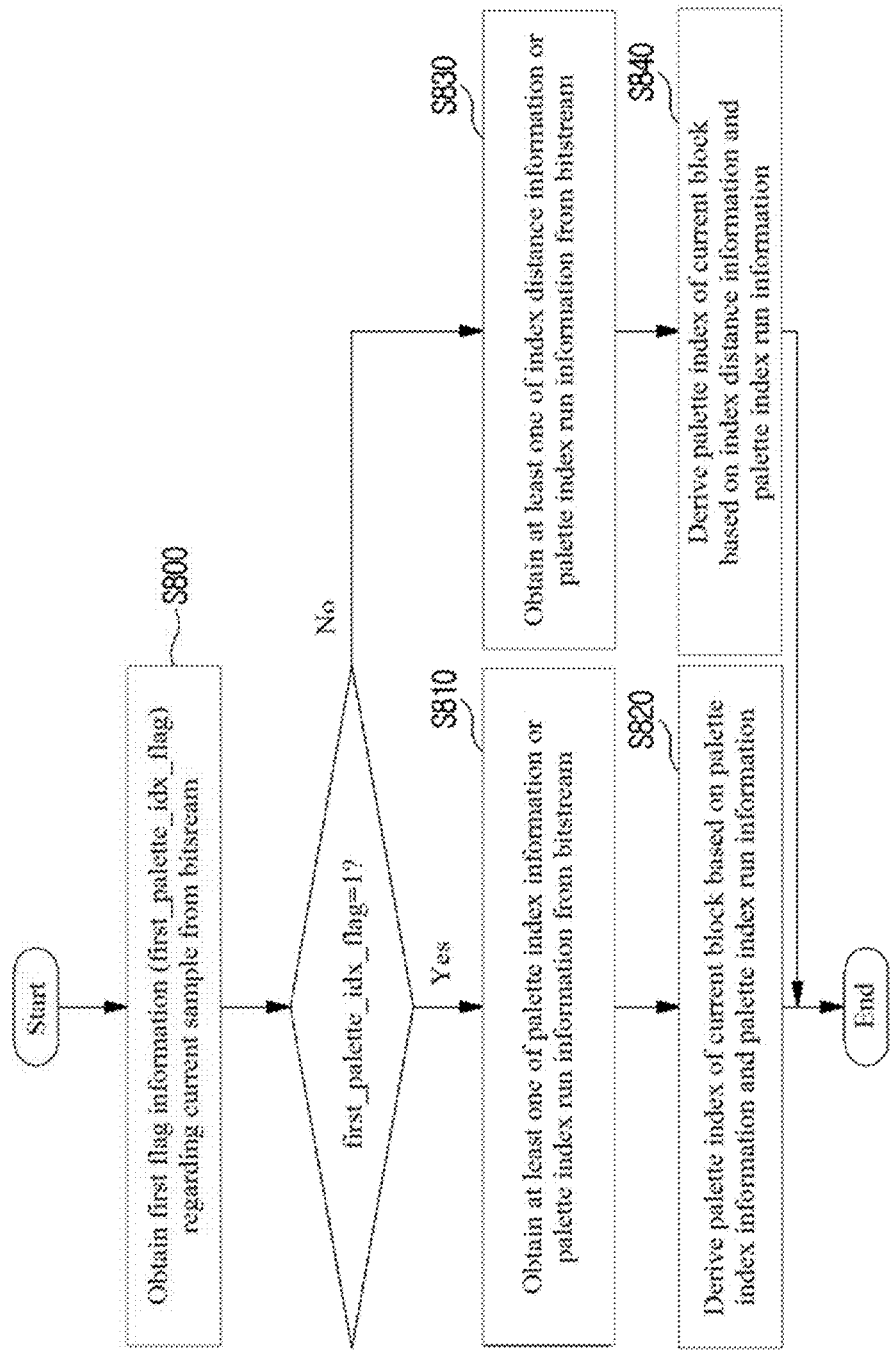
FIG. 8 illustrates a method of deriving a palette index of a current block based on an index string matching technique according to an embodiment of the present invention.

FIG. 8 illustrates a method of deriving a palette index of a current block based on an index string matching technique according to an embodiment of the present invention.

Referring to FIG. 8, the first flag information (first_palette_idx_flag) regarding the current sample in the current block may be obtained from the bitstream (S800).

The first flag information may indicate whether the palette index of the current sample is the palette index used in the current decoding buffer. The current decoding buffer may store the palette index used in the block, in a block unit. A block unit may mean one coding block or prediction block, and may mean a block composed of a plurality of coding blocks or prediction blocks.

For example, if the value of the first flag information is 1, this may indicate that the palette index of the current sample is not the palette index used in the current decoding buffer. If the value of the palette index is 0, it may indicate that the palette index of the current sample is used as a palette index of another sample having a scan order before the current sample.

If the value of the first flag information obtained in step S800 is 1, at least one of palette index information (palette_idx) or palette index run information (palette_idx_run) may be obtained from the bit stream (S810).

Here, the palette index information is encoded to specify the palette index of the current sample, and the palette index run information may mean the number of samples in which a palette index of the same value continuously occurs after the current sample. The palette index run information may be encoded with a most significant bit and an offset at the video encoding apparatus. In this case, the palette index run information may include most significant bit information and offset information relating to the palette index run.

All or some of the palette indices of the current block may be derived based on the palette index information and/or the palette index run information obtained in step S810 (S820).

Specifically, a palette index according to the palette index information may be allocated to the current sample, and a palette index having the same value as the current sample may be allocated sequentially or in parallel as many as the number of samples corresponding to the palette index run information.

On the other hand, if the value of the first flag obtained in step S800 is 0, at least one of the index distance information (distance_minus1_from_used_idx) or the palette index run information (palette_idx_run) may be obtained from the bitstream (S830).

Herein, the index distance information is encoded to specify the position of the previous sample having the same palette index as the current sample. The previous sample is a sample having a scan order earlier than the current sample. The previous sample may mean a sample having a last scan order, among samples having the same palette index as the current sample. The palette index run information is as described in step S810.

Also, the index distance information and/or the palette index run information may be encoded with a most significant bit and an offset at the video encoding apparatus. In this case, the index distance information and/or the palette index run information may also be composed of most significant bit information and offset information.

All or some of the palette indices of the current block may be derived based on the index distance information and/or the palette index run information obtained in step S830 (S840).

Specifically, a previous sample having a palette index of the same value as the current sample may be specified based on the index distance information. A palette index of the specified previous sample may be assigned to the current sample. Then, a palette index having the same value as the current sample may be allocated sequentially or in parallel as many as the number of samples corresponding to the palette index run information.

Figure 9:
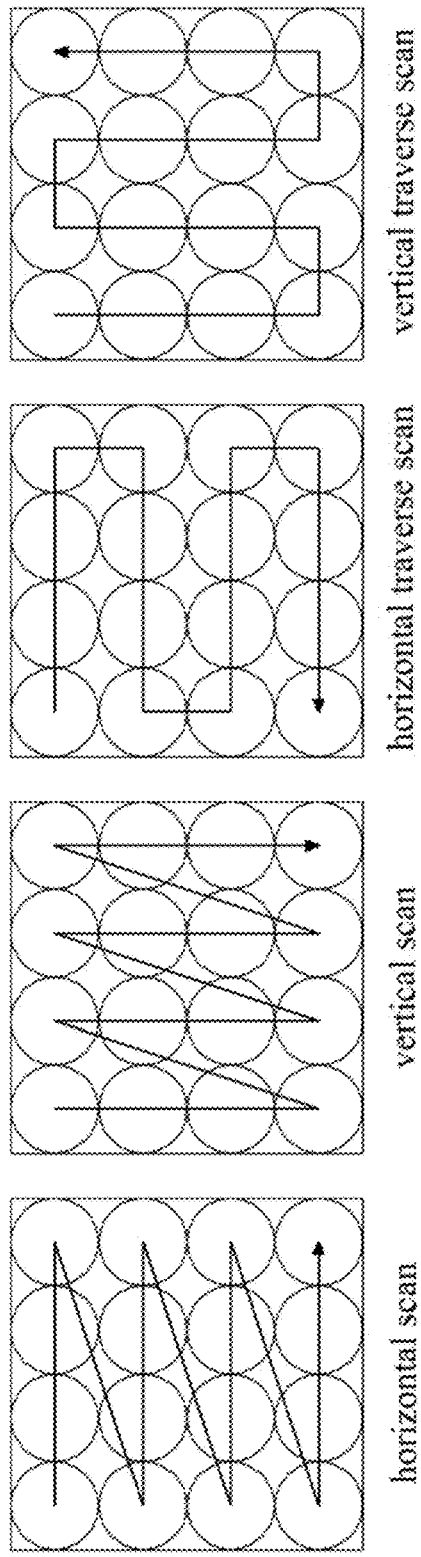
FIG. 9 illustrates a scan order in the palette mode according to an embodiment of the present invention.

FIG. 9 illustrates a scan order used in the palette mode according to an embodiment of the present invention.

Referring to FIG. 9, the scan order used in the palette mode includes a horizontal scan, a vertical scan, a horizontal traverse scan, and a vertical traverse scan.

Specifically, the horizontal scan is a method of scanning each row of the current block from left to right, and the vertical scan is a method of scanning each column of the current block from top to bottom.

The horizontal traverse scan is a method of scanning the odd rows of the current block from left to right and the even rows from right to left. A vertical traverse scan is a method in which odd columns of the current block is scanned from top to bottom while an even columns are scanned from bottom to top.

However, in this embodiment, it is assumed that the upper-left sample of the current block is set to be the scan start position, but the present invention is not limited to this, and another corner sample of the current block may be set to be the scan start position.

Figure 10:
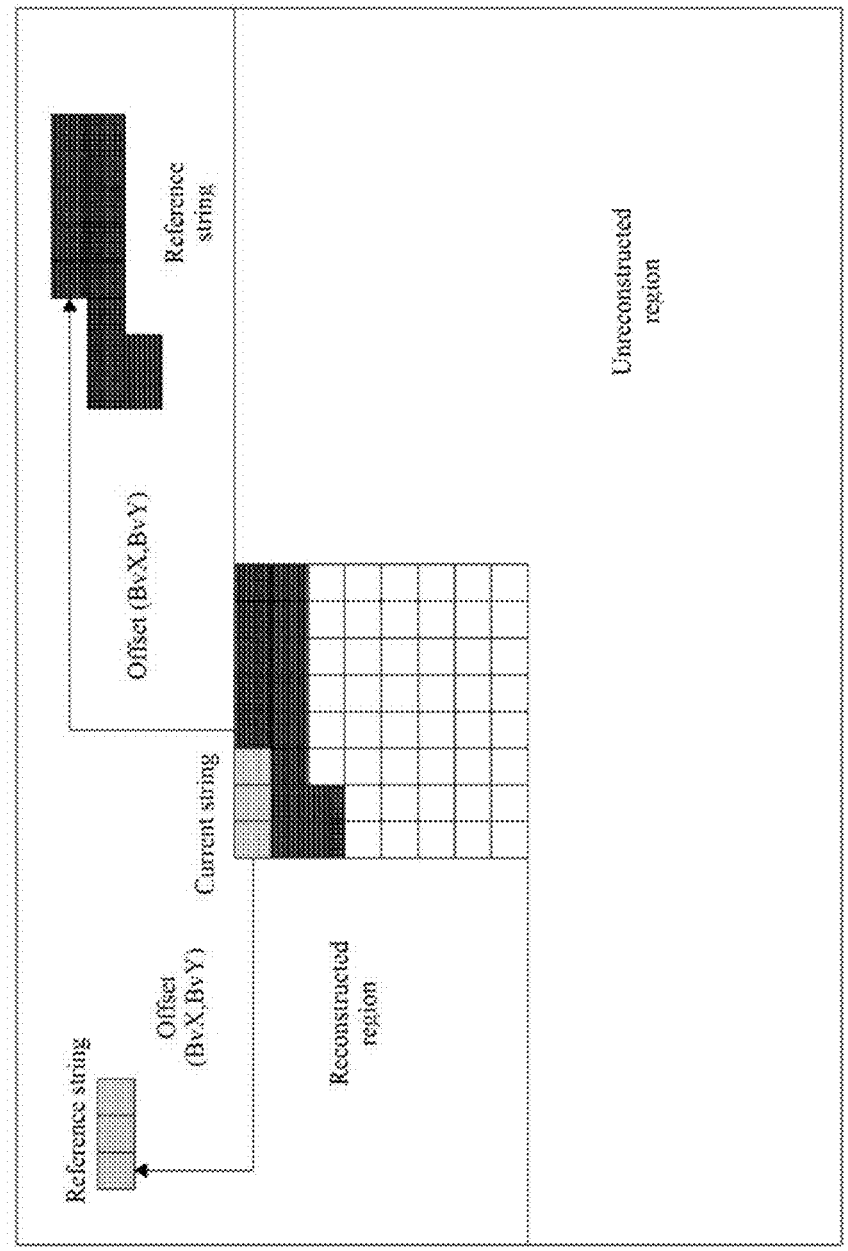
FIG. 10 illustrates a schematic configuration of a sample string matching technique according to an embodiment of the present invention.

FIG. 10 shows a schematic configuration of a sample string matching technique according to an embodiment of the present invention.

A series of samples of a predetermined length in the current block (hereinafter referred to as string) may be predicted/restored by referring to a sample dictionary composed of samples restored before the current image to be decoded or successive samples in the reconstructed image of the current picture Referring to FIG. 10, a reference string may be specified using the length of a current string and a string vector indicating a position difference between a reference string and a current string. A sample of a current string may be predicted or restored by using the specified reference string. This method will hereinafter be referred to as a sample string matching technique.

The sample dictionary may include one or more reference string candidates and may include an index for identifying each reference string candidate. A reference string candidate may refer to a set of one or more pixels.

The sample dictionary may be updated by adding or deleting all or some reference string candidates in the process of restoring the current image.

For example, a reference string referenced by a neighboring block adjacent to the current block may be added as a reference string candidate of the current block. Alternatively, a reference string candidate of the current block may be specified based on the length of the string and/or offset which the neighboring block uses to specify the reference string, and this may be added to the sample dictionary.

Alternatively, a reference string candidate belonging to a different tile than the current block or belonging to another slice (or slice segment) may be removed from the sample dictionary for the current block. If the current block is divided into a plurality of partitions according to the partition mode, the reference string candidate used by one of the plurality of partitions may be removed from the sample dictionary for another partition.

Figure 11:
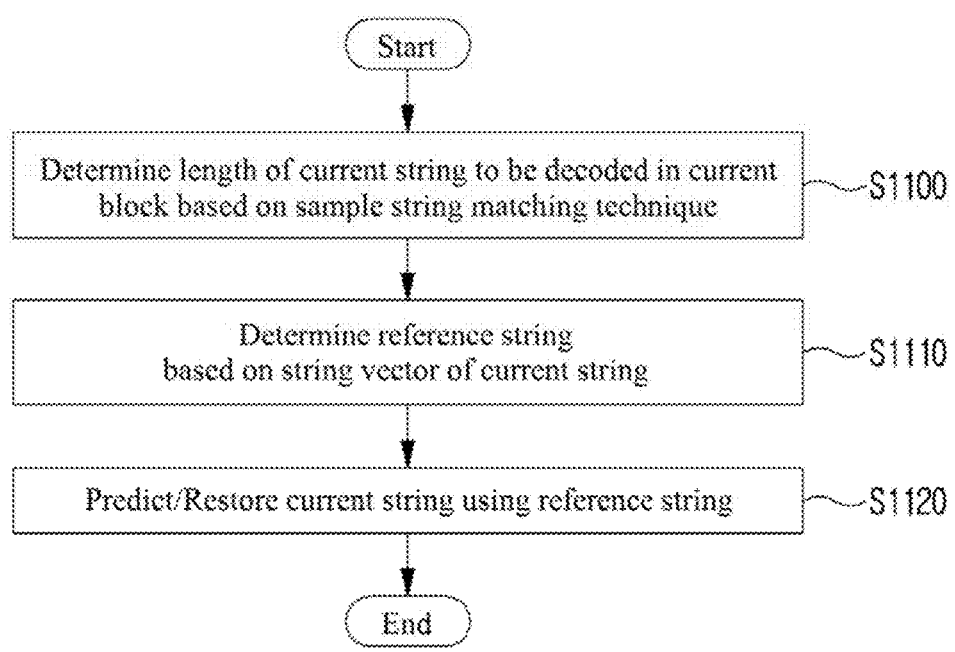
FIG. 11 illustrates a process of predicting/restoring a current block based on a sample string matching technique according to an embodiment of the present invention.

FIG. 11 illustrates a process of predicting/restoring a current block based on a sample string matching technique according to an embodiment of the present invention.

Referring to FIG. 11, a length of a current string to be decoded in a current block may be determined based on a sample string matching technique (S1100).

Specifically, the video encoding apparatus may limit the minimum length of a string for sample string matching. For example, a string of a length equal to 1 may be restricted from being used in sample string matching. In this case, the video encoding apparatus may determine the length of the current string, encode the string length information (dic_pred_length_minus2) by subtracting 2 from the determined length of the current string, and signal it to the video decoding apparatus.

The video decoding apparatus may derive the length of the current string by adding 2 to the string length information (dic_pred_length_minus2) received from the video encoding apparatus. However, when a string of a length equal to 1 is used in sample string matching, the video encoding apparatus may determine the length of the current string, encode the string length information (dic_pred_length_minus1) by subtracting 1 from the determined length of the current string, and signal it to the video decoding apparatus. In this case, the video decoding apparatus may derive the length of the current string by adding 1 to the string length information (dic_pred_length_minus1) received from the video encoding apparatus.

However, the present invention is not limited to this, and the video encoding apparatus may variably set the minimum length of the string for sample string matching and limit the maximum length of the string used for sample string matching.

The string length information (for example, dic_pred_length_minus2 and dic_pred_length_minus1) may be encoded with a value (string_len_div_width) divided by the width of the current block and the remaining value (string_len_refine). In this case, the video decoding apparatus may receive the string_len_div_width and string_len_refine from the video encoding apparatus, and derive the string length information as shown in the following Equation 1.

$$\text{String length information} = \text{string\_len\_div\_width} * \text{width} + \text{string\_len\_refine} \quad \text{[Equation 1]}$$

Alternatively, the string length information may be encoded with two components, the most significant bit and the offset for the value of the string length information. Here, the offset may mean a difference between a value of the string length information and a value corresponding to the most significant bit.

For example, when the value of the string length information is 18, the most significant bit of the string length information is encoded as 4, and the offset is encoded as 2, which is a difference of the string length information equal to 18 and 16 being a value corresponding to the most significant bit equal to 4.

In this case, the video decoding apparatus may receive the most significant bit information (string_len_msb) and offset information (string_len_offset) from the video encoding apparatus, and derive the string length information as shown in the following Equation 2.

$$\text{String length information} = 1 << \text{string\_len\_msb} + \text{string\_len\_offset} \quad \text{[Equation 2]}$$

The length of the current string may be derived by considering whether the first and last samples of the current string are present in the same row. This will be described in detail with reference to FIG. 12.

Referring to FIG. 11, a reference string may be determined based on a string vector relating to a current string (S1110).

Here, the string vector is information encoded to specify a reference string referenced by the current string, and may represent a position difference between the current string and the reference string. For example, a string vector may refer to a position difference between a top-left sample of a current block including a current string and a top-left sample of a reference block including a reference string. In this case, the current string specifies a reference block including the reference string based on the string vector, and a string at the same position as the current string in the specified reference block may be determined as a reference string.

Alternatively, the string vector may mean the position difference between the top-left sample of the current block including the current string and the first sample of the reference string, or the position difference between the first sample of the current string and the first sample of the reference string.

On the other hand, the video encoding apparatus may encode the string vector information (string_vector) by encoding the string vector of the current string as it is. In this case, the video decoding apparatus may derive the string vector based on the signaled string vector information (string_vector) from the video encoding apparatus.

Alternatively, the video encoding apparatus may encode the string vector with a value (string_vector_div_width) obtained by dividing the string vector by the width of the current block and its remaining value (string_vector_refine). In this case, the video decoding apparatus may derive a string vector based on signal_vector_div_width and string_vector_refine signaled from the video encoding apparatus. For example, the string vector may be derived as shown in Equation 3.

$$\text{String vector} = \text{string\_vector\_div\_width} * \text{width} + \text{string\_vector\_refine} \quad \text{[Equation 3]}$$

Alternatively, the video encoding apparatus may encode the string vector with a most significant bit (string_vector_msb) and an offset (string_vector_offset) for the value of the string vector. Here, the offset may mean a difference between a value of the string vector and a value corresponding to the most significant bit. In this case, the video decoding apparatus may derive a string vector using signal_vector_msb and string_vector_offset signaled from the video encoding apparatus. For example, the string vector may be derived as shown in Equation 4.

$$\text{String vector} = 1 << \text{signal\_vector\_msb} + \text{string\_vector\_offset} \quad \text{[Equation 4]}$$

The reference string of the present invention may be included in the same picture as the current string. The reference string may refer to one or more sample arrays which restored before the current string. However, the present invention is not limited to this, and the reference string may be included in the reference picture restored before the current picture and stored in the buffer.

In addition, the reference string may have the same length and/or shape as the current string. For this, the reference string may be determined using the length of the current string determined in step S1100. Alternatively, a predetermined scaling factor may be applied to the reference string to have the same length and/or shape as the current string. An interpolation filter or sub-sampling filter may be applied to the reference string to have the same length and/or shape as the current string.

Referring to FIG. 11, the current string may be predicted/restored using the reference string determined in step S1110 (S1120).

Specifically, a predicted sample of the current string may be obtained based on a reconstructed sample of the reference string. In this case, the residual sample for the current string may be signaled through the bitstream. The current string may be restored using the residual sample and the predicted sample of the current string.

Alternatively, the restored sample of the reference string may be set to be the restored sample of the current string.

Figure 12:
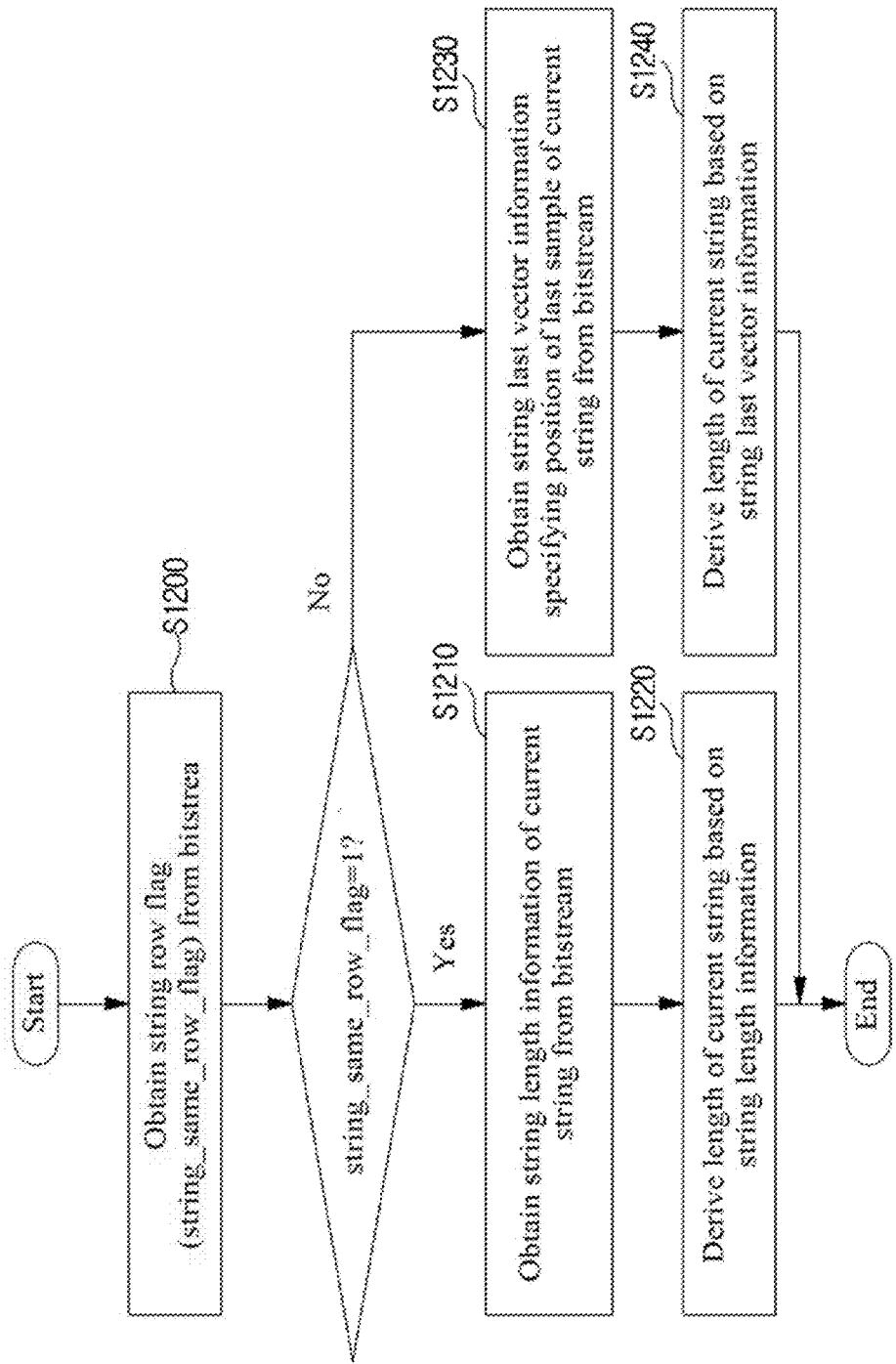
FIG. 12 illustrates a method of deriving a length of a current string based on whether or not the first sample and the last sample of a current string exist in the same row, according to an embodiment of the present invention.

FIG. 12 illustrates a method of deriving a length of a current string based on whether or not the first sample and the last sample of a current string exist in the same row, according to an embodiment of the present invention.

Referring to FIG. 12, a string row flag (string_same_row_flag) may be obtained from the bit stream (S1200).

Here, the string row flag may indicate whether the first sample and the last sample of the current string belong to the same row. For example, if the value of the string row flag is 1, the first and last samples of the current string belong to the same row, and if the value of the string row flag is 0, the first and last samples of the current string may not belong to the same row.

Referring to FIG. 12, if the value of the string row flag is 1, the string length information relating to the current string may be obtained from the bit stream (S1210).

The string length information in this embodiment is encoded to specify the length of the current string, and has been described in detail with reference to FIG. 11, but a detailed description thereof will be omitted.

The length of the current string may be derived based on the string length information obtained in step S1210 (S1220).

On the other hand, if the value of the string row flag is 0, the string last vector information (string_last_vector_X, string_last_vector_Y) for specifying the position of the last sample of the current string may be obtained from the bitstream (S1230).

Here, the string last vector may indicate the position difference between the top-left sample of the current block and the last sample of the current string, or the position difference between the first sample and the last sample of the current string.

If the first and last samples of the current string belong to different rows, the y component of the string last vector information is greater than or equal to one. Therefore, the video encoding apparatus may perform encoding a value obtained by subtracting 1 from the y component of the string last vector and signaling it. The video decoding apparatus may reconstruct the y component by adding 1 to the signalized string last vector information (string_last_vector_Y_minus1).

The length of the current string may be derived based on the string last vector information obtained in step S1230 (S1240).

Specifically, the position of the last sample of the current string is specified by the string last vector information, and the length from the first sample to the last sample of the current string may be derived. Here, the position of the first sample of the current string may be derived based on the position of the last sample of the previous string.

INDUSTRIAL AVAILABILITY

The present invention can be used to code a video signal.

The invention claimed is:

1. A method of decoding a video signal, the method comprising:
    determining a length of a current string to be decoded in a current block, based on a sample string matching technique;
    determining a reference string based on at least one of a length of the current string or a string vector relating to the current string; and
    predicting the current string using the determined reference string.

2. The method of claim 1, wherein the length of the current string is determined based on encoded string length information, and
    wherein the encoded string length information includes most significant bit information and offset information relating to the length of the current string.

3. The method of claim 1, wherein determining the length of the current string comprises:
    obtaining a string row flag relating to the current string from a bitstream, the string row flag indicating whether the first sample and the last sample of the current string belong to the same row;
    obtaining, based on the string row flag, from a bitstream, string last vector information for specifying a position of the last sample of the current string; and
    determining the length of the current string based on the position of the first sample of the current string and the obtained string last vector information.

4. The method of claim 1, wherein the string vector indicates a position difference between a top-left sample of a current block including the current string and a top-left sample of a reference block including the reference string, and
    wherein the reference string is determined to be a string at the same position as the current string in the reference block specified by the string vector.

5. An apparatus of decoding a video signal, the apparatus comprising:
    a prediction unit for determining, based on a sample string matching technique, a length of a current string to be decoded within a current block, determining a reference string based on at least one of the length of the current string or a string vector relating to the current string, and predicting the current string by using the determined reference string.

6. The apparatus of claim 5, the prediction unit determines the length of the current string based on based on encoded string length information, the encoded string length information including most significant bit information and offset information relating to the length of the current string.

7. The apparatus of claim 5, wherein the apparatus further comprises an entropy-decoding unit for obtaining a string row flag relating to the current string from a bitstream, the string row flag indicating whether the first sample and the last sample of the current string belong to the same row, and obtaining, based on the string row flag, from a bitstream, string last vector information for specifying a position of the last sample of the current string; and wherein the prediction unit determines the length of the current string based on the position of the first sample of the current string and the obtained string last vector information.

8. The apparatus of claim 5, wherein the string vector indicates a position difference between a top-left sample of a current block including the current string and a top-left sample of a reference block including the reference string, and wherein in the prediction unit, the reference string is determined to be a string at the same position as the current string in the reference block specified by the string vector.

9. A method of encoding a video signal, the method comprising:

determining a length of a current string to be decoded in a current block, based on a sample string matching technique;

determining a reference string based on at least one of a length of the current string or a string vector relating to the current string; and predicting the current string using the determined reference string.

10. The method of claim 9, wherein the length of the current string is determined based on string length information, and wherein the string length information is encoded with most significant bit information and offset information relating to the length of the current string.

11. The method of claim 9, wherein determining the length of the current string comprises:

determining whether the first sample and the last sample of the current string belong to the same row; and encoding string last vector information for specifying a position of the last sample of the current string when the first sample and the last sample of the current string belong to the same row.

12. The method of claim 9, wherein the string vector indicates a position difference between a top-left sample of a current block including the current string and a top-left sample of a reference block including the reference string, and wherein the reference string is determined to be a string at the same position as the current string in the reference block specified by the string vector.

13. An apparatus of encoding a video signal, the apparatus comprising:

a prediction unit for determining, based on a sample string matching technique, a length of a current string to be decoded within a current block, determining a reference string based on at least one of the length of the current string or a string vector relating to the current string, and predicting the current string by using the determined reference string.

14. The method of claim 13, wherein the prediction unit determines whether the first sample and the last sample of the current string belong to the same row, and encodes string last vector information for specifying a position of the last sample of the current string when the first sample and the last sample of the current string belong to the same row.

15. The method of claim 13, wherein the string vector indicates a position difference between a top-left sample of a current block including the current string and a top-left sample of a reference block including the reference string, and wherein the reference string is determined to be a string at the same position as the current string in the reference block specified by the string vector.

* * * * *